United States Patent
Sezaki

(10) Patent No.: US 6,324,615 B1
(45) Date of Patent: *Nov. 27, 2001

(54) DATA PROCESSOR

(75) Inventor: Isao Sezaki, Kanagawa (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/229,035

(22) Filed: Jan. 12, 1999

(30) Foreign Application Priority Data

Jan. 12, 1998 (JP) .................................................. 10/003759

(51) Int. Cl.$^7$ ....................................................... G06F 13/38
(52) U.S. Cl. ............................. 710/131; 710/126; 326/30
(58) Field of Search ................................. 710/126, 129, 710/131; 326/30; 364/240

(56) References Cited

U.S. PATENT DOCUMENTS 3,932,841 * 1/1976 Deerfield et al. .................. 340/172.5

FOREIGN PATENT DOCUMENTS

| 4-131955 | 5/1992 | (JP) . |
| 4-344987 | 12/1992 | (JP) . |
| 6-152618 | 5/1994 | (JP) . |
| 6-236345 | * 8/1994 | (JP) . |
| 7-21113 | * 1/1995 | (JP) . |
| 9-288640 | 11/1997 | (JP) . |

* cited by examiner

Primary Examiner—Ario Etienne
(74) Attorney, Agent, or Firm—Scully, Scott, Murphy & Presser

(57) ABSTRACT

To provide a data processor having a bus means whereby high-speed data exchange can be performed stably among a plurality of inner circuits (1 to 5) without dissipation of useless current, the bus means comprises more than one bus selectors (7 and 8) cascade-connected into a loop by way of bus lines. Each (7) of the bus selectors outputs bus data supplied from a preceding bus selector (8) as bus data to be supplied towards a following bus selector (8) when none of the inner circuits (1 to 3) connected to the bus selector (7) enables an output enable signal, and outputs output data of one of the inner circuits (1 to 3) connected to the bus selector (7) as the bus data to be supplied towards the following bus selector (8) when the inner circuit enables the output enable signal.

5 Claims, 3 Drawing Sheets

DATA PROCESSOR

BACKGROUND OF THE INVENTION

The present invention relates to a data processor having bus lines whereby data exchange is commonly performed among a plurality of inner circuits.

In a conventional data processor having such bus lines, a three-state buffer, which outputs high-impedance output states other than HIGH and LOW logical states, is provided for each of the inner circuits, and only one of the three-state buffer is permitted to exclusively drive the bus lines so that output data of more than one inner circuits may not collide on the bus lines.

FIG. 5 is a block diagram illustrating a partial configuration of a conventional data processor around the bus lines, wherein inner circuits of the data processor, such as an instruction processor, an instruction fetch unit, a cache memory or a main memory, are represented by inner circuts 11 to 15 connected to the bus lines.

In each of the inner circuits 11 to 15, a three-state buffer is provided, which connects output data of respective one of the inner circuits 11 to 15 to the bus lines time-divisionally, controlled with an output enable signal which is generated according to active status of a bus-usage permission signal supplied to the respective inner circuit from a bus controller 6 for permitting exclusive usage of the bus lines. The output data connected to the bus lines is supplied directly to every of the inner circuits 11 to 15 trough the bus lines.

The bus controller 6 takes charge of arbitrating usage of the bus lines according to bus-usage request signals received from the inner circuits 11 to 15 and enables one of bus-usage permission signals each connected to each of the inner circuits 11 to 15, respectively.

Each of the inner circuits 11 to 15 controls its three-state buffer by way of the output enable signal generated according to the bus-usage permission signal delivered from the bus controller 6, and the three-state buffer of the inner circuit whereof the bus-usage permission signal is enabled drives the bus lines of 32 signal lines, for example, exclusively. Thus, data exchange among the inner circuits 11 to 15 is performed commonly, making use of the bus lines.

However, in the conventional data processor, every one of the bus lines must be wired so as to connect with the three-state buffer of every one of the inner circuits. Therefore, the bus lines become inevitably long and their parasitic capacitance becomes large when the number of the inner circuits increases. The wiring widths are very narrow in the highly integrated circuit. Hence, the long bus lines bring high wiring resistance, which becomes a factor of transmission delay of the data exchanged by way of the bus lines, obstructing high-speed data transmission even when the bus lines are driven by transistors of high fan-out ability.

Furthermore, the outputs of every of the three-state buffers are directly connected to the bus lines, in the conventional data processor. Therefore, there may arise an overlap of different outputs from different three-state buffers, resulting in dissipation of useless current.

Still further, a pull-up or a pull-down circuit must be provided to each of the bus lines, for preventing them from being left floating when no three-state buffer drives the bus lines. Otherwise, the high-impedance of the bus lines may cause through current flowing through input gates of the three-state buffers.

SUMMARY OF THE INVENTION

Therefore, a primary object of the present invention is to provide a data processor having a bus means whereby high-speed data exchange can be performed stably without dissipation of useless current, by resolving above problems of the conventional data processor.

In order to achieve the object, a data processor according to the invention has a bus means whereby data exchange among a plurality of inner circuits is commonly performed. The bus means comprises more than one bus selectors cascade-connected into a loop by way of bus lines. Each of the bus selectors outputs bus data supplied from a preceding bus selector as bus data to be supplied towards a following bus selector when none of the inner circuits connected to the bus selector enables an output enable signal, and outputting output data of one of the inner circuits connected to the bus selector as the bus data to be supplied towards the following bus selector when the inner circuit enables the output enable signal.

Each of the bus selectors comprises:

a pre-selector for selecting output data of one of the inner circuits connected to the bus selector when the inner circuit enables the output enable signal; and a selector for outputting the bus data supplied from the preceding bus selectors as the bus data to be supplied towards the following bus selectors when none of the inner circuits connected to the bus selector enables the output enable signal, and outputting the output data selected by the pre-selector when the inner circuit connected to the bus selector enables the output enable signal.

Therefore, the bus lines can be divided into short sections each driven by a bus selector, and the effect of the wiring resistance of the bus lines to the transmission delay of the bus data can be reduced compared to the conventional data processor.

Furthermore, each section of the bus lines is sufficient to connect each neighboring two bus selectors directly. Therefore, when the number of inner circuits is large, total wiring length of the bus lines can be shortened compared to the bus lines of the conventional data processor which should be connected to the three-state buffer of every of the inner circuits. Hence, wiring resistance and parasitic capacitance of a data path connecting the inner circuits can be reduced, enabling high-speed transmission of the bus data, as well as a compact and a small space layout of the integrated circuit.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
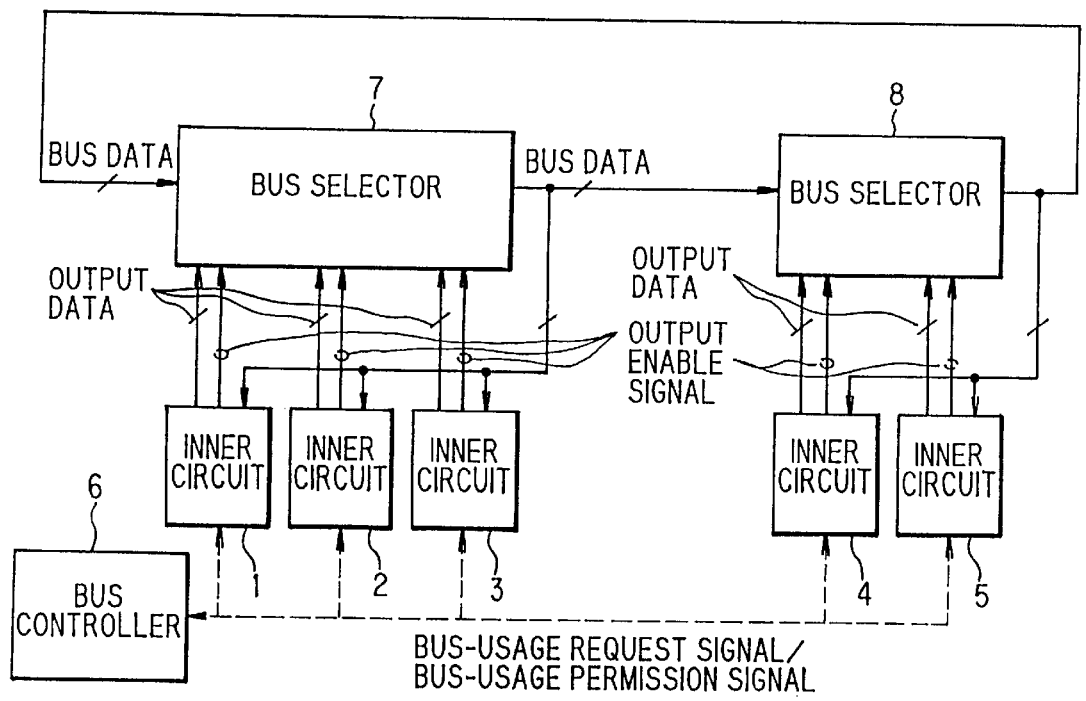
FIG. 1 is a block diagram illustrating a partial configuration of a data processor according to a first embodiment of the invention.

FIG. 1 is a block diagram illustrating a partial configuration of a data processor according to a first embodiment of the invention.

Referring to FIG. 1, the data processor of the embodiment comprises a plurality of inner circuits, such as an instruction processor, an instruction fetch unit, a cache memory or a main memory, represented by inner circuits 1 to 5, a bus controller 6, and more than one bus selectors represented by a first and a second bus selector 7 and 8.

Figure 5:
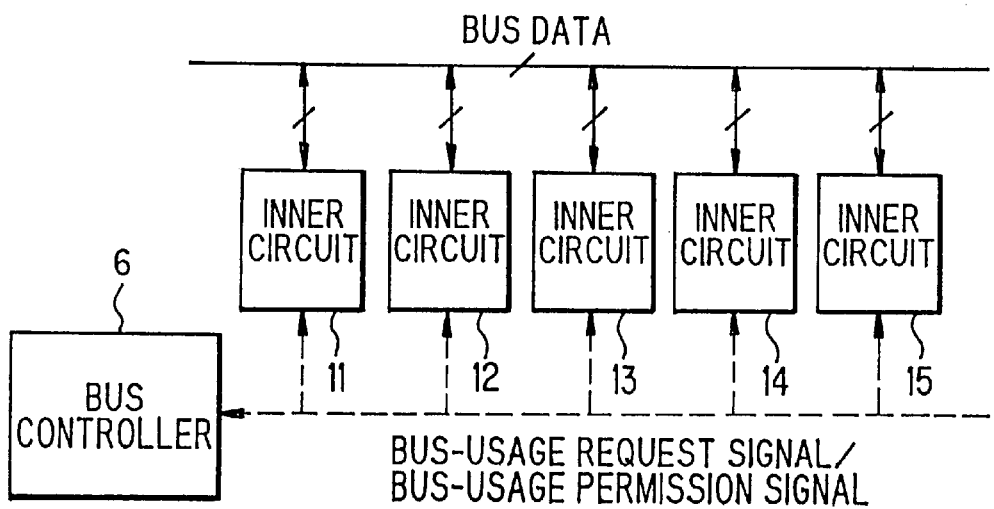
FIG. 5 is a block diagram illustrating a partial configuration of a conventional data processor around the bus lines.

Different from the inner circuits 11 to 15 of FIG. 5, the inner circuits 11 1 to 5 of FIG. 1 are not provided with the three-state buffers, and output data is directly outputted together with all output enable signal from each of the inner circuits 1 to 5. The output enable signal, which was used for controlling the three-state buffer in the inner circuits 11 to 15, is generated in the same way according to the bus permission signal supplied from the bus controller 6.

The bus controller 6 operates in the same way with the conventional data processor of FIG. 5, and duplicated descriptions are omitted.

The output data and the output enable signal of each of the inner circuits 1 to 5 are supplied to nearby one of the bus selectors which are cascade-connected into a loop by way of bus lines. In the example of FIG. 1, the output data and the output enable signals of the inner circuits 1 to 3 are inputted to the first bus selector 7 and those of the inner circuits 4 and 5 are inputted to the second bus selector 8.

When none of the output enable signals inputted to the first bus selector 7 is active, the first bus selector 7 outputs bus data supplied from its preceding bus selector, that is, the second bus selector 8, to its following bus selector, which is also the second bus selector 8, in the example of FIG. 1. When one of the output enable signal is made active by respective one of the inner circuits 1 to 3, the first bus selector 7 outputs the output data corresponding to the output enable signal which is made active, as the bus data to be supplied towards the following bus selector.

The second bus selector 8 has the same configuration and operates in the same way with the first bus selector 7.

Figure 2:
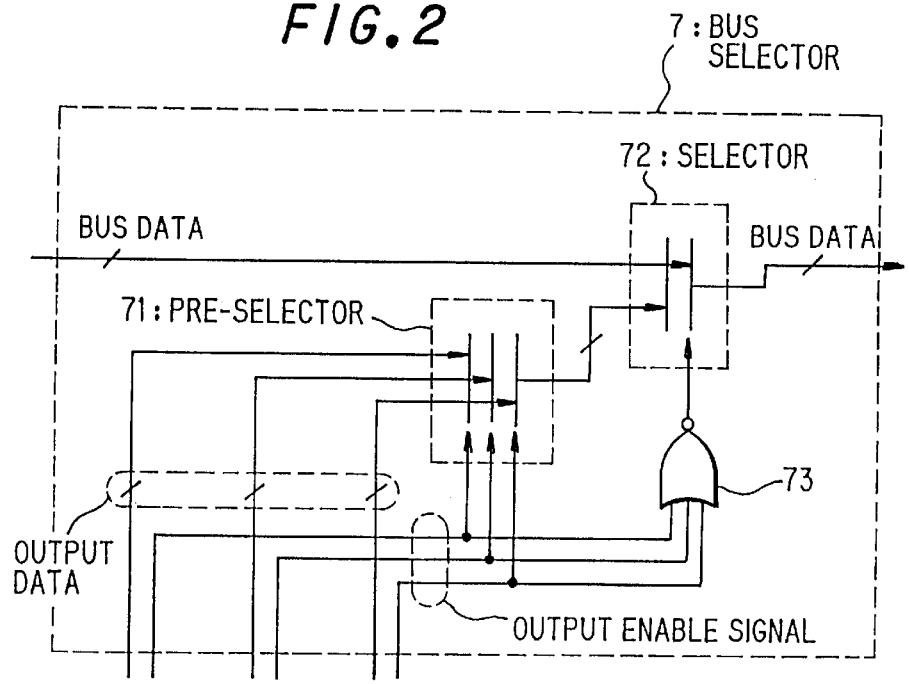
FIG. 2 is a block diagram illustrating the first bus selector 7 of FIG. 1.

In the following paragraphs, a configuration example of the bus selectors is described referring to a block diagram of FIG. 2 illustrating the first bus selector 7, by way of example.

The first bus selector 7 comprises a pre-selector 71, a selector 72 and a multi-input NOR gate 73.

To the pre-selector 71, output data and respective output enable signals outputted from the inner circuits 1 to 3 are inputted and when one of the output enable signals is active, corresponding output data is selected to be inputted to the selector 72.

The output enable signals are also supplied to the multi-input NOR gate 73 and NOR logic of the output enable signals is supplied to the selector 72, which selects the bus data supplied from the preceding bus selector when the output of the multi-input NOR gate 73 is active, and otherwise selects the output data of the pre-selector 72.

Now, operation of the first embodiment is described.

When the output enable signal from the inner circuit 1 becomes active or logic '1', for example, according to the bus-usage permission signal enabled by the bus controller 6, the output data of the inner circuit 1 is selected by the pre-selector 71 and connected to the selector 72, in the first bus selector 7. The output of the multi-input NOR gate 73 being disabled to logic '0', the output of the pre-selector 71, that is, the output data of the inner circuit 1 is selected by the selector 72 and outputted as the bus data towards the following bus selector 8, instead of the bus data supplied from the preceding bus selector 8.

In this situation, the output enable signals supplied to the second bus selector 8 from the inner circuits 4 and 5 are both inactive, or at logic '0'. Hence, the bus data outputted from the first bus selector 7 is selected by the selector of the second bus selector 8 as the bus data from the preceding bus selector 7 to be outputted as the bus data towards the following bus selector 7.

Thus, both the first and the second bus selector 7 and 8 output the output data of the inner circuit 1 as the bus data, in order to be referred to by any of the inner circuits 1 to 5.

In the same way as above described, output data of any one of the inner circuits 1 to 5 can be transmitted to any other of the inner circuits 1 to 5, by enabling desired one of the bus-usage permission signals.

Thus, the first and the second bus selector 7 and 8, which are cascade-connected into the loop by way of the bus lines, operate as a bus means for taking charge of data exchange among the inner circuits 1 to 5 under control of the bus controller 6, in the same way with the three-state buffers of FIG. 5 each connected to the bus lines.

Here, it should be noted that the bus lines of the embodiment are divided into short sections each driven by respective one of the bus selectors. Therefore, the effect of the wiring resistance to the transmission delay of the bus data can be far reduced.

Furthermore, each section of the bus lines is sufficient to connect each neighboring two bus selectors directly, in the embodiment of FIG. 1. Therefore, when the number of inner circuits is large, total wiring length of the bus lines can be considerably shortened compared to the bus lines of the conventional data processor of FIG. 5 which should be connected to the three-state buffer of every of the inner circuits 11 to 15. Hence, wiring resistance and parasitic capacitance of a data path connecting the inner circuits can be considerably reduced, even though data paths between the bus selector and the inner circuits are taken in consideration, and consequently, transmission delay of the bus data can be decreased.

Still further, even when the number of inner circuits is increased, it is sufficient to provide one bus selector for a group of inner circuits. Therefore, increase of the transmission delay of the bus data can be suppressed compared to the conventional data processor of FIG. 5, as well as the increase of the chip space of the integrated circuit.

Figure 3:
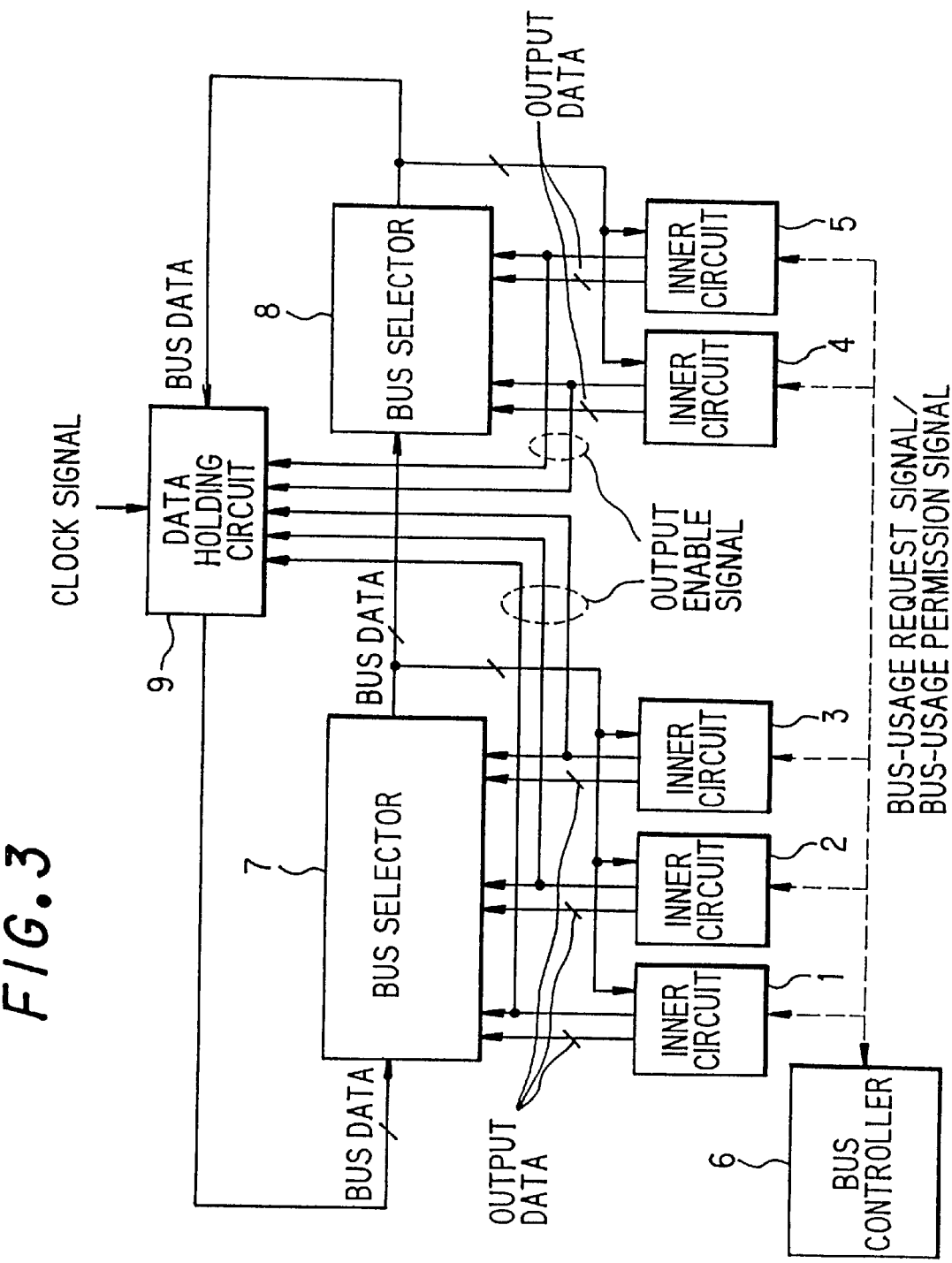
FIG. 3 is a block diagram illustrating a partial configuration of a data processor according to a second embodiment of the invention.

Now, a second embodiment of the invention will be described referring to a block diagram of FIG. 3.

In the data processor according to the second embodiment, a data holding circuit 9 is comprised in addition to the configuration of the data processor of FIG. 1.

The data holding circuit 9 is inserted in the loop of the bus selectors 7 and 8 cascade-connected, and the output enable signals of all of the inner circuits 1 to 5 are supplied to the data holding circuit 9 together with a clock signal.

Figure 4:
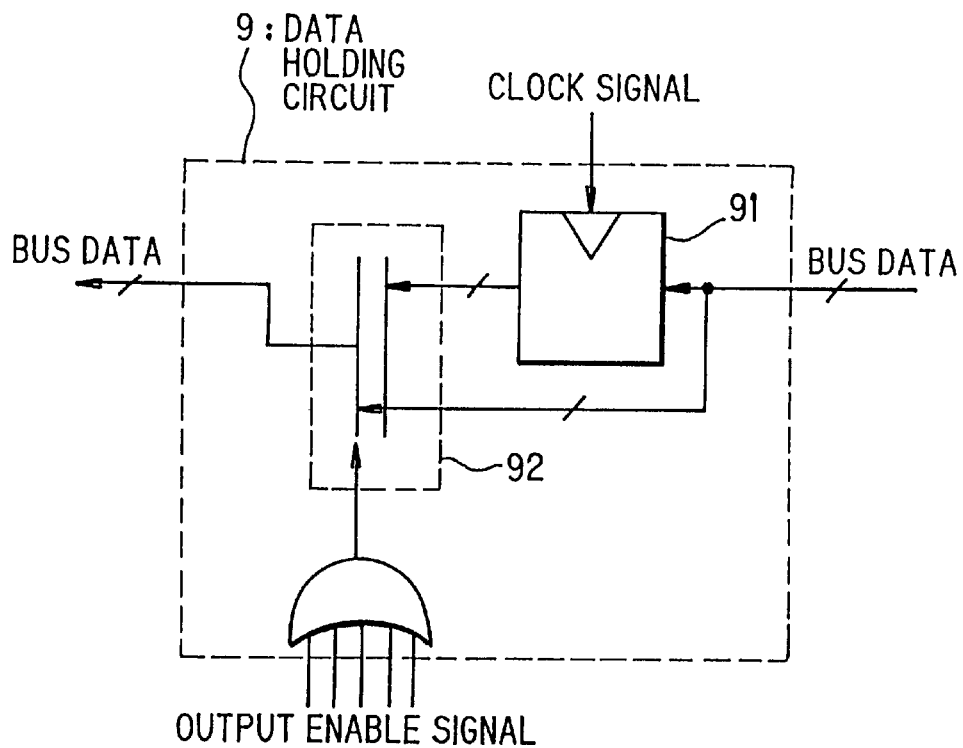
FIG. 4 is a block diagram illustrating a configuration example of the data holding circuit 9 of FIG. 2.

FIG. 4 is a block diagram illustrating a configuration example of the data holding circuit 9, comprising a register 91, a selector 92 and a multi-input OR gate 93.

The register 91 holds bus data inputted from its preceding bus selector, that is, the second bus selector 8 in the example, according to the clock signal. The multi-input OR gate 93 outputs OR logic of the output enable signals to the selector 92. When output logic of the multi-input OR gate 93 is active, that is, one of the output enable signals is active, the selector 92 selects the bus data inputted from the preceding bus selector 8 as the bus data to be outputted towards the following bus selector 7, and selects bus data held in the register 91 when none of the output enable signals is active.

Therefore, even when the output enable signals of all the inner circuits 1 to 5 are inactive, the bus data held in the register 91 is supplied to the bus lines from the data holding circuit 9, for preventing the bus data from becoming unstable due to self-oscillation thereof through the feedback loop of the first and the second bus selector 7 and 8.

As heretofore described, the bus lines can be divided into short sections each driven by a bus selector, in the data processor according to the invention. Therefore, the effect of the wiring resistance of the bus lines to the transmission delay of the bus data can be reduced compared to the conventional data processor.

Further, each section of the bus lines is sufficient to connect each neighboring two bus selectors directly. Therefore, when the number of inner circuits is large, total wiring length of the bus lines can be shortened compared to the bus lines of the conventional data processor which should be connected to the three-state buffer of every of the inner circuits. Hence, wiring resistance and parasitic capacitance of a data path connecting the inner circuits can be reduced, enabling high-speed transmission of the bus data, as well as a compact and a small space layout of the integrated circuit.

Further, even when the number of inner circuits is increased, it is sufficient to provide one bus selector for a group of inner circuits. Therefore, increase of the transmission delay of the bus data can be suppressed compared to the conventional data processor.

Still further, output data of only one of the inner circuit, or the held data, when there is no output data to be transmitted in the second embodiment, is connected to the bus lines, being selected by the bus selectors. Therefore, dissipation of useless current due to collision of the output data or the high impedance of the bus lines can be effectively prevented, in the data processor according to the invention.

What is claimed is:

1. A data processor for performing data exchange commonly among inner circuits and providing reduced wiring resistance and parasitic capacitance of a data path connecting the inner circuits, comprising:

more than one bus selectors cascade-connected into a loop by way of bus lines, each of the bus selectors outputting bus data supplied from a preceding one of the bus selectors as bus data to be supplied toward a following one of the bus selectors when none of the inner circuits connected to said each of the bus selectors enables an output enable signal, wherein each of the bus selectors comprises:

a pre-selector for selecting output data of one of the inner circuits connected to said each of the bus selectors when said one of the inner circuits enables the output enable signal; and a selector for outputting the bus data supplied from the preceding one of the bus selectors as the bus data to be supplied toward the following one of the bus selectors when none of the inner circuits connected to said each of the bus selectors enables the output enable signal, and outputting the output data selected by the pre-selector when one of the inner circuits connected to said each of the bus selectors enables the output enable signal; and a plurality of said inner circuits connected to said each of the bus selectors, each of the inner circuits enabling said bus selectors to output the output data of one of the inner circuits as bus data to be supplied toward the following one of the bus selectors when said one of the inner circuits enables the output enable signal.

2. A data processor as recited in claim 1; wherein output data of one of the inner circuits is outputted cyclically from the bus selectors when none of the inner circuits enables the output enable signal.

3. A data processor as recited in claim 1; further comprising:

a data holding circuit inserted in the loop for holding bus data supplied from a preceding one of the bus selectors, outputting the bus data supplied from the preceding one of the bus selectors as bus data to be supplied towards a following one of the bus selectors when one of the inner circuits enables the output enable signal, and outputting the bus data held therein as the bus data to be supplied towards the following one of the bus selectors when none of the inner circuits enables the output enable signal.

4. A data processor as recited in claim 3; the data holding circuit comprises:

a register for holding the bus data supplied from the preceding one of the bus selectors; and a selector for outputting the bus data supplied from the preceding one of the bus selectors as the bus data to be supplied towards the following one of the bus selectors when one of the inner circuits enables the output enable signal, and outputting the bus data held in the register as the bus data to be supplied towards the following one of the bus selectors when none of the inner circuits enables the output enable signal.

5. A data processor as recited in claim 1, wherein the bus data outputted from said each of the bus selectors is supplied to every of the inner circuits connected to said each of the bus selectors.

* * * * *